United States Patent
Hertling et al.

(10) Patent No.: US 8,205,193 B2
(45) Date of Patent: Jun. 19, 2012

(54) RUNTIME UPDATING OF VIRTUAL MACHINE CLASS FILES

(75) Inventors: William Hertling, Portland, OR (US); Michael D Whitmarsh, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2784 days.

(21) Appl. No.: 09/879,399

(22) Filed: Jun. 11, 2001

(65) Prior Publication Data
US 2002/0188935 A1 Dec. 12, 2002

(51) Int. Cl.
*G06F 9/44* (2006.01)
*G06F 9/45* (2006.01)

(52) U.S. Cl. ......... 717/166; 717/116; 717/148; 717/167

(58) Field of Classification Search .................. 717/148, 717/168–178, 166; 345/749
See application file for complete search history.

(56) References Cited

U.S. PATENT DOCUMENTS

| | | | |
|---|---|---|---|
| 5,926,631 A | 7/1999 | McGarvey | |
| 5,966,702 A * | 10/1999 | Fresko et al. | 707/1 |
| 5,999,732 A * | 12/1999 | Bak et al. | 717/148 |
| 6,026,405 A | 2/2000 | Arda et al. | |
| 6,072,953 A * | 6/2000 | Cohen et al. | 717/166 |
| 6,175,855 B1 | 1/2001 | Reich et al. | |
| 6,470,494 B1 * | 10/2002 | Chan et al. | 717/166 |
| 6,530,080 B2 * | 3/2003 | Fresko et al. | 717/166 |
| 6,745,386 B1 * | 6/2004 | Yellin | 717/166 |
| 6,826,750 B1 * | 11/2004 | Curtis et al. | 717/170 |
| 6,865,730 B1 * | 3/2005 | Burke et al. | 717/116 |
| 6,915,511 B2 * | 7/2005 | Susarla et al. | 717/166 |
| 6,944,846 B2 * | 9/2005 | Ryzhov | 717/116 |
| 7,020,874 B2 * | 3/2006 | Sokolov et al. | 717/166 |
| 7,882,501 B1 * | 2/2011 | Carlson et al. | 717/167 |
| 2001/0044790 A1 * | 11/2001 | Taivalsaari et al. | 707/1 |
| 2002/0007357 A1 * | 1/2002 | Wong et al. | 707/1 |
| 2002/0093856 A1 * | 7/2002 | Baentsch et al. | 365/200 |
| 2002/0165727 A1 * | 11/2002 | Greene et al. | 705/1 |

FOREIGN PATENT DOCUMENTS

| | | |
|---|---|---|
| JP | 2000-105704 | 4/2000 |
| JP | 2001-256053 | 9/2001 |
| WO | WO98/37486 | 8/1998 |

OTHER PUBLICATIONS

Williams, "Java Perks Developer Interest from is to Embedded Systems", May 1996, Computer Design's: Electronic Systems Technology & Design, vol. 35, Issue 6.*

Qian et al., A formal specification of Java class loading, Oct. 2000, 12 pages, <http://delivery.acm.org/10.1145/360000/353193/p325-qian.pdf>.*

Liang et al., Dynamic class loading in the Java virtual machine, Oct. 1998, 9 pages, <http://delivery.acm.org/10.1145/290000/286945/p36-liang.pdf>.*

* cited by examiner

*Primary Examiner* — Thuy Dao

(57) ABSTRACT

The invention relates to a computer-implemented method of updating a virtual machine class file, including the steps of identifying a class file for execution by a virtual machine, accessing the class file in a class file repository, and downloading the class file to a file system associated with the virtual machine.

22 Claims, 2 Drawing Sheets

RUNTIME UPDATING OF VIRTUAL MACHINE CLASS FILES

FIELD OF THE INVENTION

The present invention relates generally to computing, and more particularly, to computers employing virtual machine runtime environments. More particularly still, the invention relates to a method of updating virtual machine class files with a virtual machine class loader, typically utilizing a computer system that includes the virtual machine and is in communication with a class file repository.

BACKGROUND OF THE INVENTION

A "virtual machine" is a self-contained operating environment that is executed by a computer processor, but behaves as if it is a separate computer. A virtual machine application will execute and run the same way in that virtual machine, no matter what kind of computer and operating system the virtual machine is running on. This offers the user true independence from any particular computer platform.

This system independence has resulted in virtual machines becoming common components of most web browsers. Website designers wishing to utilize small programs, or applets, on their web pages often utilize virtual machine applets, so that any visitor to the web page may run the applet regardless of the kind of computer or operating system they are using, requiring only that they have the appropriate virtual machine interpreter installed.

Most, but not all virtual machines are interpreters for an object-oriented programming language. The most common example of an object oriented programming language is JAVA (Sun Microsystems, Inc.). Interpreters and runtime environments for compiled JAVA code are called JAVA virtual machines, or JVMs. Although the JAVA virtual machine has become the industry standard, there are a variety of virtual machines that are derived from and/or are compatible with JAVA code, including but not limited to CHAI (Hewlett-Packard Company), KAFFE (TransVirtual Technologies, Inc.), LATTE (Seoul National University), and SABLEVM (Sable Research Group). Other virtual machines exist independent of the JAVA programming language, including the DIS virtual machine for the INFERNO operating system (a LIMBO compiler; Lucent Technologies, Inc.).

Class files are the components of compiled source code for the virtual machine. They exist in a precisely defined format, so that they may be loaded and executed by the appropriate virtual machine. Virtual machine class files are also platform-independent. Class files may be present as part of a "class package", where a package is a collection of related classes and interfaces. The terms "class file", "class package" and "class loader" as used here are independent of any particular virtual machine interpreter.

At present, developers of new virtual machine applications face difficulties in getting their new software to their users. One approach to distributing new or upgraded software is to create custom installation software, and incorporate it into a distribution package. The distribution package must then be sent to all the users of the software, either as a mass mailing that includes the software on a computer-readable medium, or by publishing the installation software on a network and permitting users to download the upgrade. The former is expensive and potentially wasteful, as it may target users who are not interested in getting the upgraded software package. The latter strategy may not reach every interested customer, generating customer ill will when software incompatibilities arise. In either event, these methods of distribution represent substantial overhead for software developers, particularly if the developer is new, small, or simply has limited resources.

Unfortunately, if developers do not earnestly attempt to keep their users updated with the most-recent versions or newest class files, errors may arise when virtual machine applications need a particular class file that the user does not have. The execution of a class file "A" may result in an instruction to execute class file "B". If class file B is not found by the virtual machine, then it typically generates an "exception". In general, an exception is generated whenever the virtual machine encounters a situation unforeseen by the virtual machine programmer (including but not limited to program errors). When an exception occurs, the virtual machine may attempt to locate code that will deal with the specific exception. Typically, a failure to find a requested class file results in a "Class Not Found" exception that is typically fatal, that is, it results in the virtual machine shutting down and failing to continue processing.

What is needed is a virtual machine configured such that, if it fails to find a requested class file, it searches for and locates the requested class file, downloads the requested class file, and executes it, all without generating an exception. This method could be used to update the class files of virtual machine users, and would virtually guarantee that the users of a particular class file would always have the most-recent version of the class file, without relying on expensive or ineffective distribution strategies.

SUMMARY OF THE INVENTION

The invention involves a computer-implemented method of updating a virtual machine class file, including the steps of identifying a class file for execution by a virtual machine, accessing the class file in a class file repository, and downloading the class file to a file system associated with the virtual machine.

DETAILED DESCRIPTION OF THE INVENTION

Figure 1:
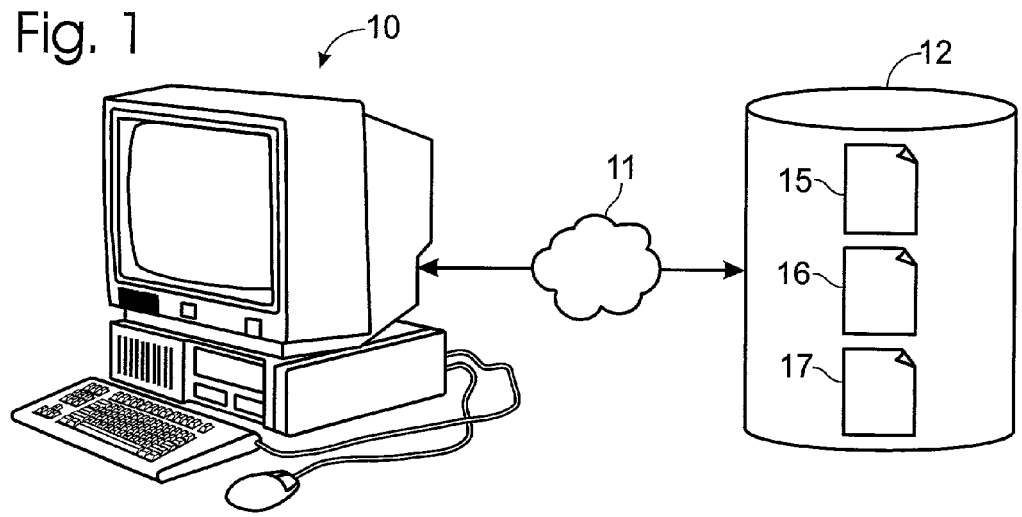
FIG. 1 is a schematic diagram showing a computer system according to one embodiment of the present invention.

A computer of the invention is shown in FIG. 1. A computer 10 is linked to a class file repository 12 via a network 11. The network 11 may be a local area network, or a wide area network, such as the Internet. The computer includes a processor that executes a virtual machine 20, and a file system 21 associated with the virtual machine that the virtual machine utilizes to access previously stored class files as needed. The file system 21 is present in computer memory, typically onboard computer 10. Individual class files stored in the file system 21 are depicted as 25 and 26.

The virtual machine typically uses a software component called a "class loader" to locate a requested class file. The virtual machine relies upon a previously defined "class path" to define the locations of directories and subdirectories where class files available to the virtual machine are stored. As used herein, the class path is an environment variable listing multiple file path entries, each path ending in a filename or directory, telling the virtual machine where it can find class files that are not part of the virtual machine platform itself. Class files are typically stored in either directories (folders) or in archive files.

The class loader typically locates required class files by relying upon a standardized naming convention for the class files of the virtual machine. That is, a specific class file will have a given name, no matter where it is saved. For example, for the JAVA virtual machine, class packages are named in lowercase with periods indicating directory levels. The prefix of the class package name is a top-level domain name, such as com, edu, gov, mil, net, org, or a two-letter country identifier. The subsequent components of the class package name vary according to the organization that developed the class file itself, but typically the components of the name following the domain may include a reference to the developer organization, a specific division, department, project, machine, or login name. For example: A class package developed by Sun Microsystems may have the prefix com.sun, while one developed by Apple Computers may have the prefix com.apple. Representative class package names include edu.abc.cs-.johns.banana, or com.ibm.eng.static.v3, or com.acme.server.servlet.extension.

Figure 2:
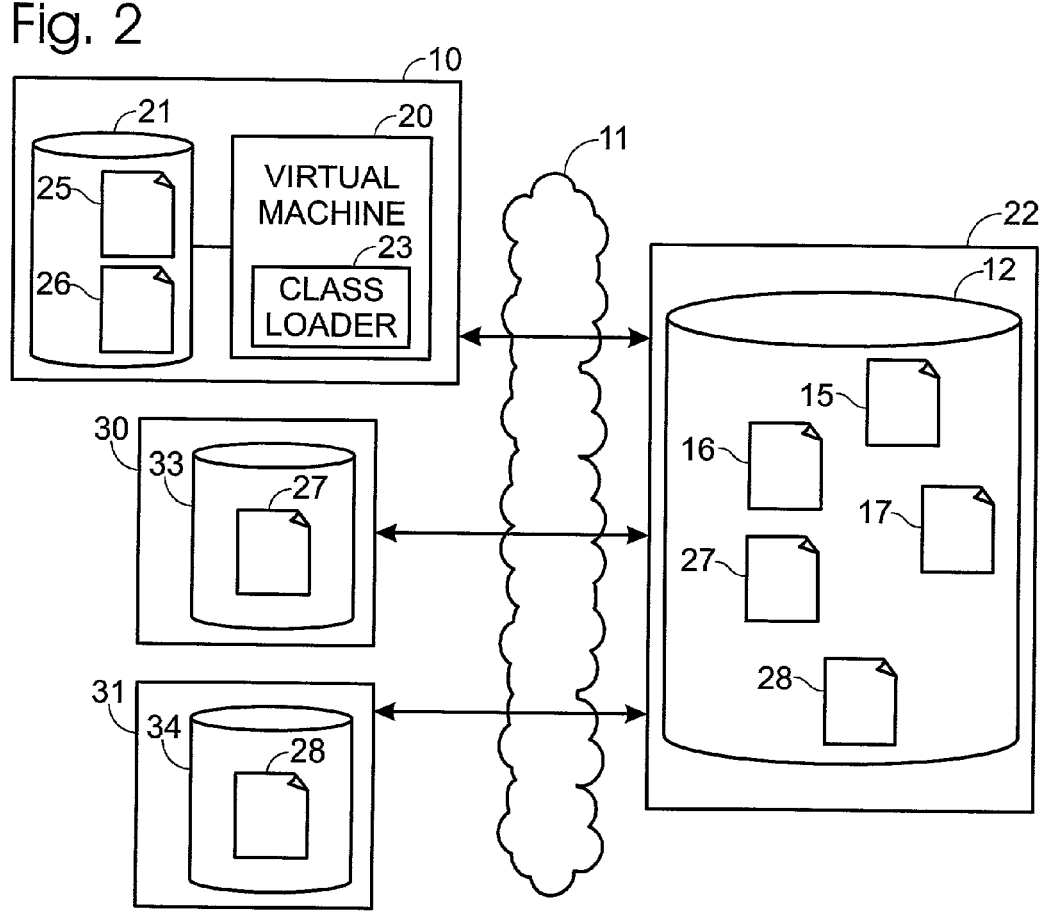
FIG. 2 is a schematic depiction of components of a computer system used in updating virtual machine class files according to one embodiment of the present invention.

As depicted in FIG. 2, class files 25 and 26 are located in the file system of the virtual machine 20, and their locations are specified in the class path. If the virtual machine should require class file 26, for example, the class loader 23 searches file system 21 for class file 26, locates class file 26, and the virtual machine executes the class file.

If, upon execution, class file 26 itself requires class files 15 and 16, a typical class loader would be unable to locate class files 15 and 16 in the file system, and the virtual machine would generate an exception. However, the class loader of the present invention, if unable to locate class files 15 and 16 in the file system, automatically searches the class file repository 12, located on a server 22. The address of the class file repository is defined for the class loader, typically in the class path. Once the class loader locates class files 15 and 16 in the repository, class files 15 and 16 are downloaded to the file system 21 and executed.

The class file repository is located on a server 22. Server 22 is optionally connected to a local network, or directly connected to computer 10. Server 22 is typically connected to computer 10 via the Internet. There may be more than one class file repository accessible to the virtual machine class loader 23. The class loader may search any class file repository that has a defined path in the class path for the virtual machine. In one example, the class file repository is specified by a URL in the class path, specifying a machine connected to the Internet, and a directory on that machine, such as "http://www.hp.com/classfile_repository". If there are multiple class file repositories listed in the class path, then the class loader will search multiple repositories. The class file repository may be administered such that only a single copy of a given class file is retained at a given time. Alternatively, the class file repository may maintain multiple versions of a given class file, including more recent and less recent versions.

Figure 3:
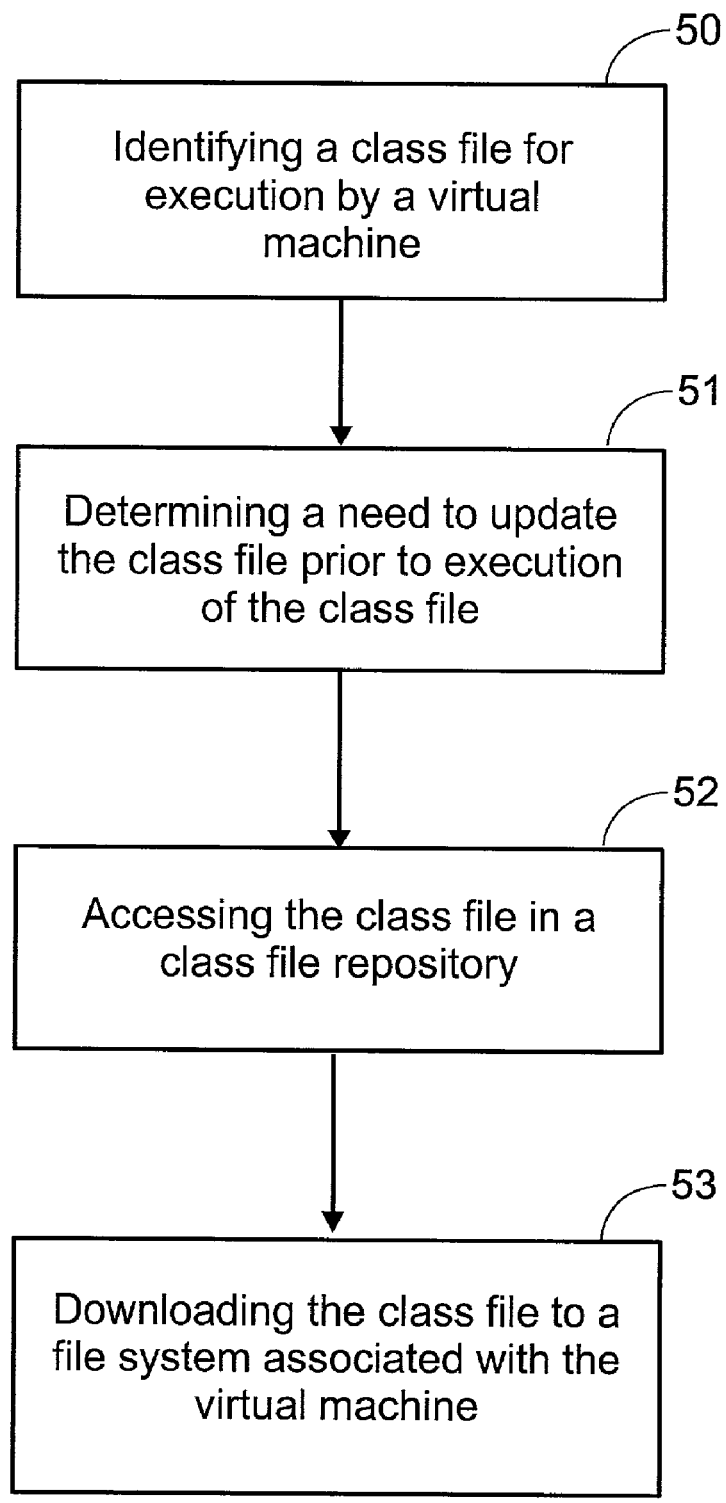
FIG. 3 is a flowchart depicting a method of updating virtual machine class files according to one embodiment of the present invention.

The method of the invention is outlined in a flowchart in FIG. 3, and includes the steps of identifying 50 a class file for execution by a virtual machine, determining 51 a need to update the class file prior to execution of the class file, accessing 52 the class file in a class file repository, and downloading 53 the class file to a file system associated with the virtual machine.

In one aspect of the invention, the step of identifying a class file for execution corresponds to executing a first class file that requires the execution of a second class file. For example, the execution of a primary class file "A" may require the execution of secondary class file "B", which may in turn require the execution of a tertiary class file "C". In this aspect, execution of primary class file "A" identifies class file "B" for execution. A failure to find class file "B" in the file system associated with the virtual machine then corresponds to the step of determining a need to update class file "B".

The step of determining a need to update the class file may correspond to confirming that the required class file is not present in the file system associated with the virtual machine. That is, if the required class file is not available, the class loader will locate it in the repository and download it for execution by the virtual machine. In this aspect, the virtual machine typically locates and downloads the most-recent version of the required class file. Alternatively, the step of determining a need to update the class file corresponds to identifying the version of a class file "B" required for execution by a primary class file "A", and confirming that the particular version of class file "B" is not present in the file system.

In yet another aspect of the invention, a version of the required class file exists in the file system, but it is outdated, and the virtual machine replaces it with a version from the class file repository. As used here, an "outdated" version is a version that is older than a more recently released version of the same class file, as defined by a version number specified in the name of the class file itself, or a class file that is simply older than a defined class file age, and the determination that a class file is outdated corresponds to the determination that a need exists to update the class file.

Outdated versions of class files may be replaced by ensuring that the virtual machine checks the class file repository at a predetermined time interval for a more recent version of the required class file. For example, if it has been a week, or a month, since the last time the required class file was executed, the virtual machine could be instructed to check the class file repository for a more recent version. Alternatively, the virtual machine is instructed to always check the class file repository for a more recent version of the required class file, regardless of whether the required class file is present in the file system, or how recently it has been updated. In this aspect, if a more recent version of the required class file is available in the repository, as identified either by revision number or by creation date, the more recent version is downloaded to the file system to replace the outdated version of the required class file. In this way, the most-recent version of the class file is always present in the file system.

Alternatively, the virtual machine replaces class files in the file system only when they are older than a predefined age. Typically the virtual machine will review the creation date of the required class file in the file system, compare it to the current calendar date, and determine the age of the required class file. The age of the class file will be compared to a predefined acceptable class file age, and if the class file is older than the acceptable age, a more recent version of the class file will be sought on the class file repository. By automatically replacing outdated class files, the virtual machine of the invention constantly insures that the most-recent version of each class file is present in the file system.

As the virtual machine of the invention becomes widely used, software developers may take advantage of the class file repository by uploading newly developed class files to the repository. As shown in FIG. 2, developer databases 33 and 34, located on servers 30 and 31, respectively, contain newly developed class file packages 27 and 28. By downloading class file packages 27 and 28 to repository 12, the software developers may ensure that users of the class loader of the invention are able to automatically download their improved software, without having to incur extensive distribution costs. The functionality of class files 27 and 28 is obtained by an individual computer user when needed, and is not forced upon any user that does not need the new class files. This results in efficient distribution at lower distribution costs, as well as enhanced customer satisfaction.

At its most efficient, distribution of new virtual machine applications may require nothing more than identifying the name of the main class file for a new virtual machine application. As the main class file itself specifies the additional class files required to execute the virtual machine application, merely attempting to execute the main class file would result in first, accessing the class file repository for the main class file, then as the main class file was executed, each of the additional class files and class file packages required for the application would be downloaded and executed. An entire application could be distributed on a huge scale, merely by publishing the name of that application's main class file.

The particular selection of computer type, software, virtual machine, computer-readable media type, or particular programming code is a matter of choice for the skilled artisan. Accordingly, although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances which fall within the scope of the appended claims.

We claim:

1. A computer-implemented method of providing a class file for use in a virtual machine with a virtual machine file system, comprising the steps of:
   identifying a class file for execution by a virtual machine;
   searching for the identified class file in the virtual machine file system;
   upon generating an exception associated with searching for the identified class file in the virtual machine file system, accessing the identified class file in a class file repository located outside the virtual machine file system; and
   downloading the identified class file to the virtual machine file system.

2. The method of claim 1, where the step of identifying includes executing a primary class file that requires execution of the identified class file.

3. The method of claim 2, where the primary class file specifies a particular version of the identified class file.

4. The method of claim 1, where the step of searching includes confirming that the identified class file is not present in the virtual machine file system, and generating an exception.

5. The method of claim 1, where the step of searching includes confirming that an outdated version of the identified class file is present in the virtual machine file system, and generating an exception.

6. The method of claim 5, where the outdated version of the identified class file is older than a predetermined age.

7. The method of claim 5, where the outdated version of the identified class file is older than a more recently released version of the same class file.

8. The method of claim 1, where the step of accessing the identified class file includes identifying a most-recent version of the identified class file in the class file repository.

9. The method of claim 1, where both the virtual machine and the class file repository communicate via a local network.

10. The method of claim 1, where both the virtual machine and the class file repository communicate via an Internet connection.

11. The method of claim 1, where the step of accessing the identified class file includes searching for the name of the identified class file in the class file repository.

12. A storage medium readable by a computer, having embodied therein a program of instructions executable by the computer to perform the steps of:
    identifying a class file for execution by a virtual machine having a virtual machine file system onboard the computer;
    searching for the identified class file in the virtual machine file system;
    determining a need to update the identified class file prior to execution of the identified class file;
    upon determining a need to update the identified class file, automatically accessing the identified class file in a class file repository outside the virtual machine file system; and
    downloading the identified class file to the virtual machine file system.

13. The storage medium of claim 12, where the program of instructions corresponds to a class loader for the virtual machine.

14. The storage medium of claim 12, where the need to update the identified class file is due to the file not existing in the virtual machine file system.

15. The storage medium of claim 12, where accessing the identified class file includes identifying a most-recent version of the identified class file in the class file repository.

16. The storage medium of claim 12, where the virtual machine is an interpreter for an object-oriented programming language.

17. A computer system, comprising:
    a class file repository located on a server;
    a computer including a virtual machine and a virtual machine file system located on the computer, the computer being in selective communication with the server via a communications link;
    wherein the virtual machine is configured to search the virtual machine file system for a secondary class file required by execution of a primary class file, and upon generating an exception associated with searching for the secondary class file in the virtual machine file system, to locate the secondary class file in the class file repository, and download the required class file into the virtual machine file system.

18. The computer system of claim 17, where the virtual machine is configured to locate the secondary class file in the class file repository when the class file is not present in the virtual machine file system.

19. The computer system of claim 17, where the virtual machine is configured to identify a most-recent version of the required class file.

20. The computer system of claim 17, where the virtual machine and the class file repository communicate via an Internet connection.

21. The computer system of claim 17 where the virtual machine is an interpreter for an object oriented programming language.

22. A storage medium readable by a computer, having embodied therein a program of instructions executable by the computer to:
    identify a class file for execution by a virtual machine having a virtual machine file system onboard the computer;

search for the identified class file in the virtual machine file system;
execute the identified class file;
upon generating an exception associated with executing the identified class file, automatically access a required class file in a class file repository located on a server outside of computer; and download the required class file from the class file repository to the virtual machine file system; and
execute the required class file.

* * * * *